United States Patent
Breau et al.

(10) Patent No.: US 9,143,482 B1
(45) Date of Patent: Sep. 22, 2015

(54) TOKENIZED AUTHENTICATION ACROSS WIRELESS COMMUNICATION NETWORKS

(75) Inventors: Jeremy R. Breau, Kansas City, MO (US); Terry D. Nebergall, Gardner, KS (US); Frederick C. Rogers, Olathe, KS (US); Joseph Shojayi, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 818 days.

(21) Appl. No.: 12/563,576

(22) Filed: Sep. 21, 2009

(51) Int. Cl.
*H04L 29/06* (2006.01)
*H04W 88/18* (2009.01)
*H04W 12/06* (2009.01)
*H04W 8/08* (2009.01)
*H04W 60/00* (2009.01)

(52) U.S. Cl.
CPC ............ *H04L 63/0407* (2013.01); *H04L 63/06* (2013.01); *H04L 63/08* (2013.01); *H04L 63/0807* (2013.01); *H04L 63/0892* (2013.01); *H04L 63/18* (2013.01); *H04W 8/085* (2013.01); *H04W 12/06* (2013.01); *H04W 60/00* (2013.01); *H04W 88/182* (2013.01)

(58) Field of Classification Search
CPC . H04L 63/0407; H04L 63/08; H04L 63/0892; H04L 63/06; H04L 63/18; H04L 63/0807; H04W 60/00; H04W 88/182; H04W 12/02; H04W 80/04; H04W 8/085; H04W 12/06
USPC .................................... 713/172; 726/2, 9, 20
See application file for complete search history.

(56) References Cited

U.S. PATENT DOCUMENTS

| | | | | |
|---|---|---|---|---|
| 5,564,068 A * | 10/1996 | Nguyen | ........................ | 455/433 |
| 7,587,589 B2 * | 9/2009 | England et al. | ............... | 713/155 |
| 7,797,406 B2 * | 9/2010 | Patel et al. | .................... | 709/220 |
| 7,848,737 B2 * | 12/2010 | Ramos Robles et al. | ..... | 455/411 |
| 7,979,297 B1 * | 7/2011 | Shivananda et al. | ......... | 705/7.27 |
| 2002/0035699 A1 * | 3/2002 | Crosbie | ......................... | 713/201 |
| 2002/0052754 A1 * | 5/2002 | Joyce et al. | ...................... | 705/1 |
| 2003/0220107 A1 * | 11/2003 | Lioy et al. | ................. | 455/435.1 |
| 2004/0005892 A1 * | 1/2004 | Mayer et al. | ............... | 455/432.1 |
| 2006/0058008 A1 * | 3/2006 | Choksi | .......................... | 455/406 |
| 2006/0077926 A1 * | 4/2006 | Rune | ............................. | 370/328 |
| 2008/0041937 A1 * | 2/2008 | Vawter | .......................... | 235/380 |
| 2009/0217048 A1 * | 8/2009 | Smith | ........................... | 713/176 |
| 2011/0026488 A1 * | 2/2011 | Patel et al. | .................... | 370/331 |

* cited by examiner

*Primary Examiner* — Mohammad A Siddiqi (57) ABSTRACT

Methods for marking and verifying an authentication status of a wireless communication device are disclosed. When a wireless communication device is authenticated in a first wireless communication network, copies of a token, are stored in memory accessible by the wireless communication device and in memory accessible by a clearinghouse server. The clearinghouse server also stores a correlation between the token and the identity of the server that authenticated the wireless communication device. When the wireless communication device moves from the first network to a second network, the WCD transmits the token to a server in the second network, which can then query the clearinghouse server to determine the identity of the server that authenticated the WCD in the first network, confirm the authentication status of the wireless communication device, and allow the WCD to access a resource in or via the second network.

11 Claims, 4 Drawing Sheets

TOKENIZED AUTHENTICATION ACROSS WIRELESS COMMUNICATION NETWORKS

BACKGROUND

As wireless communication systems and devices have grown in popularity and functionality, users of wireless communication devices have adopted increasingly fast-paced, mobile lifestyles. Attendant to such active lifestyles is the need to communicate with others and rapidly access information when moving through a wireless communication network and between wireless communication networks. As users increasingly rely on wireless communication systems to obtain and exchange information, wireless communication system resources have become valuable. Consequently, the ability to identify and authenticate users of wireless communication systems has become an imperative part of ensuring that users of a wireless communication system are authorized to use the valuable system resources.

In order to maintain access control over wireless communication system resources, a wireless communication network can apply an authentication process to a wireless communication device when the device attempts to use resources within the particular network. For users who move between several networks while maintaining a conversation or accessing information, repeated authentication procedures can delay, disrupt or otherwise degrade the user's ability to use the wireless communication system. Further, the authentication procedure itself can consume system resources that could be allocated elsewhere within the wireless communication system.

OVERVIEW

Methods for marking the authentication status of a wireless communication device ("WCD") and verifying the authentication status of a WCD when the WCD attempts to access a resource in or via a particular wireless communication network are presented herein. In many wireless communication systems, servers within a wireless communication network, such as Authentication, Authorization, and Accounting servers ("AAA servers") are used to authenticate a WCD before granting access to the wireless communication network, to authorize the WCD to use particular resources within the network, and to account for the WCD's use of the network resources.

In some of the methods described herein, when a WCD is authenticated in a first wireless communication network, a token is generated by the WCD, the server that authenticated the WCD, or another component of the wireless communication network. One copy of the token is then stored in memory accessible to the WCD, and a second copy of the token is published to a clearinghouse server. An identification of the server that authenticated the WCD is also published to the clearinghouse server, and a correlation between the token and the identification of the server that authenticated the WCD is stored in memory accessible to the clearinghouse server.

Traditionally, when a WCD leaves one wireless communication network and enters a second wireless communication network, the WCD is prevented from accessing resources within the second wireless communication network until the second wireless communication network has authenticated the WCD and authorized the WCD to use the second wireless communication network. The process of authenticating a WCD when it moves from one wireless communication network to a second wireless communication network can delay and even disrupt the user's ability to access resources via the WCD by restricting access to network resources until the wireless communication network successfully authenticates the WCD. Such delays and disruptions may be compounded when a user rapidly moves through multiple wireless communication networks.

In accordance with some of the methods disclosed herein, when a WCD that has been authenticated in a first wireless communication network seeks to access resources via a second wireless communication network, the WCD transmits a token that identifies the WCD to an authentication server associated with the second wireless communication network. In such example implementations, the authentication server associated with the second wireless communication network queries a clearinghouse server to determine the identity of the authentication server in the first wireless communication network that authenticated the WCD. In response to receiving from the clearinghouse server an identification of the authentication server in the first wireless communication network, the authentication server associated with the second wireless communication network can contact the authentication server in the first wireless communication network to confirm the authentication status of the WCD.

These and other aspects and advantages will become apparent to those of ordinary skill in the art by reading the following detailed description, with reference where appropriate to the accompanying drawings. Further, it should be understood that the foregoing overview merely presents examples and is not intended to limit the scope of the invention as claimed.

DESCRIPTION

Traditionally, when a WCD attempts to access a resource in or via a wireless communication network, the wireless communication network prevents the WCD from accessing network resources until the wireless communication network is able to successfully authenticate the WCD and determine that the WCD is authorized to use the wireless communication network to access the resource. Under traditional protocols, when a WCD leaves a first wireless communication network and enters a second wireless communication network, the second wireless communication network must authenticate and authorize the WCD before WCD can access resources in or via the second wireless communication network. One example situation where a WCD leaves a first wireless communication network and attempts to enter a second wireless communication network occurs when a user moves outside of the coverage area of the user's preferred wireless communication network, and attempts to connect to network that acts as a roaming partner to the user's preferred wireless communication network. The authentication and authorization process performed by the second wireless communication network can delay and even disrupt the ability of the WCD to access information and/or other resources. Such delays and disruptions can negatively impact the user's experience and undermine the user's confidence in wireless communication systems.

While authentication and authorization processes are an important part of ensuring that network resources are allocated to the proper users and preventing unauthorized users from accessing information and/or other resources via a wireless communication system, subsequent authentication procedures may be unnecessary in situations where a WCD that has already been authenticated in one wireless communication network. If the authentication status of a WCD could be marked, it may be possible to reduce the delays and disruptions in service experienced when an authenticated WCD moves between wireless communication networks by allowing other wireless communication networks to readily verify the authentication status of the WCD.

I. Example Network Architectures

Figure 1:
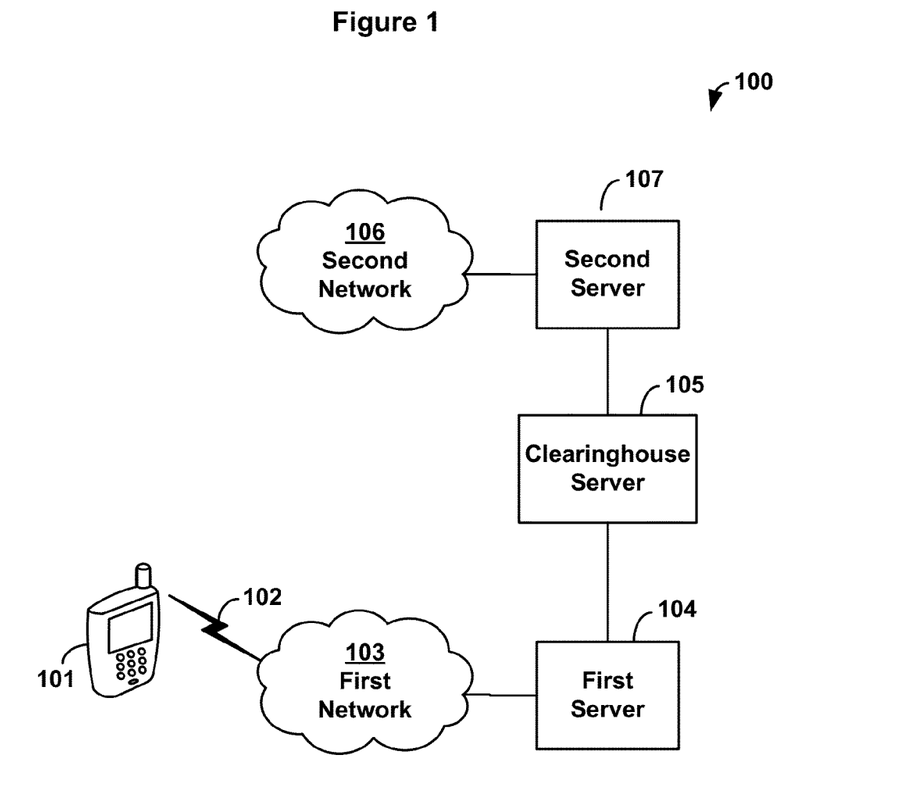
FIG. 1 is a block diagram of a wireless communication system in which example methods may be implemented.

FIG. 1 is a block diagram of a wireless communication system 100 in which example implementations of the claimed methods may be executed. As shown in FIG. 1, a WCD 101 communicates via an air interface 102 with a first wireless communication network 103. The first network 103 may include any of a number of structures, depending on the overall design of network 103. While such structures have been omitted for simplicity, those skilled in the art will appreciate that network 103 may include one or more transmitters, receivers, processors, switches, databases, or other components. First network 103 is in communication with, or may include, a first authentication server 104. The first authentication server 104 may be any server capable of performing an authentication process for the WCD 101. For example, the first authentication server 104 may be an Authentication, Authorization, and Accounting server ("AAA server"). Any means of establishing communication between the first authentication server 104 and the first network 103 may be used. For example, communication may be established via a dedicated, wired connection between one or more elements in the first network 103 and the first authentication server 104. In another example configuration, a data network may be used to establish communication between the first network 103 and the first authentication server 104.

The first authentication server 104 is also in communication with a clearinghouse server 105. Any server that is capable of storing and accessing data and capable of communicating with one or more authentication servers may be used as the clearinghouse server 105. For the purposes of simplicity, FIG. 1 shows the clearinghouse server 105 as a single entity. However, it will be appreciated that the clearinghouse server 105 may comprise one or more processors, data storage units, and other components arranged to perform the functions of the clearinghouse server. Any method of establishing communication between the clearinghouse server 105 and an authentication server, such as first authentication server 104, may be use. In some example configurations wired connections, wireless connections, and/or network connections are used to establish communication between the clearinghouse server 105 and an authentication server.

As shown in FIG. 1, system 100 also includes a second wireless communication network 106. The second wireless network 106 is capable of communicating via an air interface with a WCD, such as WCD 101. The second network 106 may be configured in accordance with any of a number of designs, and does not need to be configured to be identical to the first wireless network 103. For simplicity, the second wireless communication network 106 is depicted as a single element in FIG. 1. However, it will be appreciated by those skilled in the art that one or more transmitters, receivers, switches, databases, or other elements may be present in the second network 106. In example configurations designed to implement traditional protocols, the second network 106 does not receive a notification when a WCD, such as WCD 101, is authorized to access a resource within or via the first network 103. In one example configuration, the second network 106 is a roaming partner to the first network 103. In another example configuration, the first network 103 and the second network 106 are operated by different wireless service providers.

The second network 106 is in communication with, and may include, a second authentication server 107. Any means of establishing communication between the second network 106 and the second authentication server 107 may be used, including, for example, wired connections, wireless connections, and connections via a network. Any server capable of verifying the identity of a WCD and authorizing the WCD to access a resource in or via the second network 106 may be used as the second authentication server 107. For example, the second authentication server 107 may be an AAA server. As shown in FIG. 1, the second authentication server 107 is also in communication with the clearinghouse server 105. Any means of establishing communication between the second authentication server 107 and the clearinghouse server 105 may be used, including, for example, wired connections, wireless connections, and/or network connections.

Figure 2:
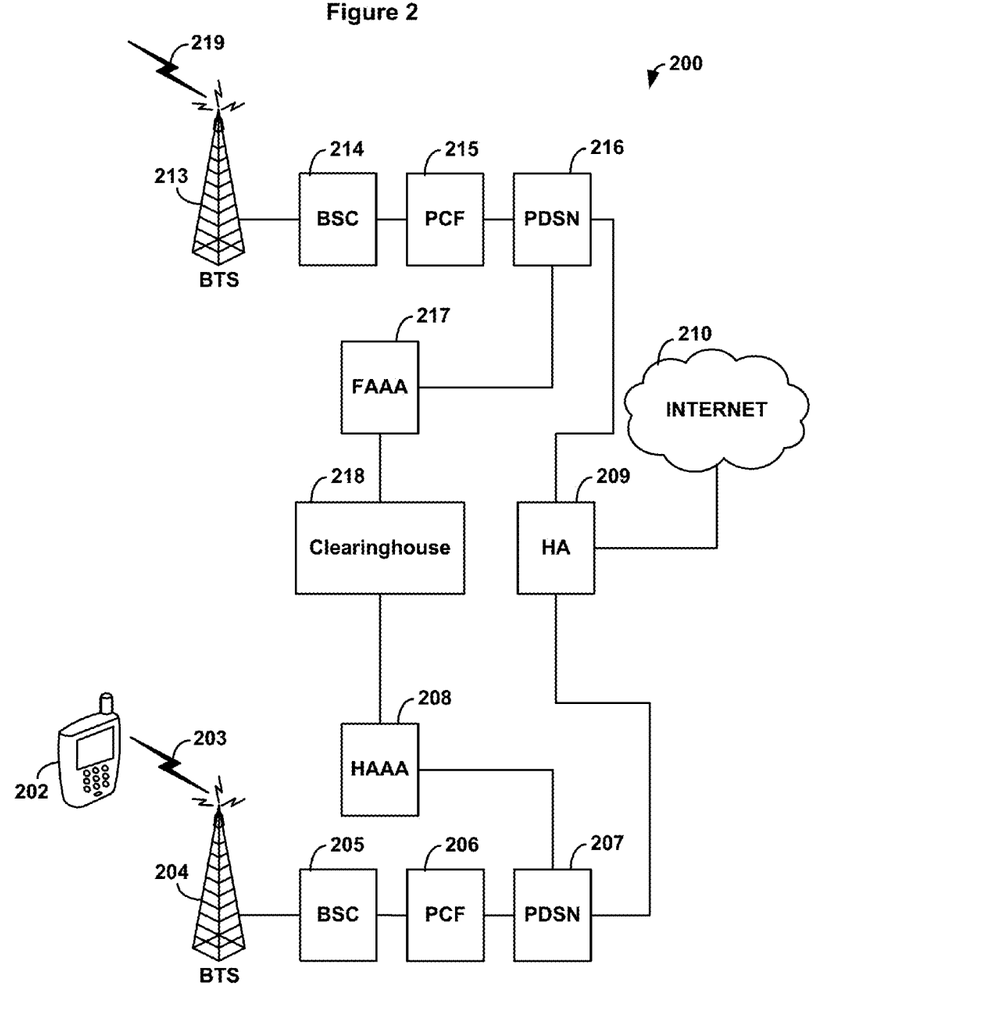
FIG. 2 is a block diagram of another communication network in which example methods may be implemented.

FIG. 2 is another block diagram of a wireless communication system 200 in which example implementations of the claimed methods may be executed. As shown in FIG. 2, a WCD 202 communicates over an air interface 203 with a first base transceiver station ("BTS") 204. Transmissions from the first BTS 204 to WCD 202 are sent via a forward link of the air interface 203. Transmissions from WCD 202 to the first BTS 204 are sent via a reverse link of the air interface 203. As shown in FIG. 2, the first BTS 204 is in communication with a first base station controller ("BSC") 205. While the first BTS 204 and the first BSC 205 are shown as separate components that are in communication with each other, it will be appreciated that the first BTS 204 and the first BSC 205 may be integrated into a single network entity and/or co-located in the same general area.

As shown in FIG. 2, the BSC 205 is also connected to a first packet control function ("PCF") 206. While the first PCF 206 is shown in FIG. 2 as a distinct network entity, it will be appreciated that the first PCF 206 and the first BSC 205 can be co-located at the same position and/or integrated into a single network entity. The first PCF 206 is also connected to a first packet data serving node ("PDSN") 207, and facilitates the communication of data between the first BSC 205 and the first PDSN 207.

Among the network entities in communication with the first PDSN 207 are a first AAA server 208 and a mobile-IP home agent ("HA") 209. Any means of establishing communication between the first PDSN 207 and the first AAA server 208 may be used, including network connections established in a packet data network, dedicated wired connections, or wireless connections, for example. Similarly, any means of establishing communication between the first PDSN 207 and the HA 209 may be used, including connections established in a packet data network, wired connections, and wireless connections, for example. As shown in FIG. 1, HA 209 is in turn connected to the public Internet 210. However, those skilled in the art will appreciate that HA 209 may be connected to a different packet data network, such as a private packet data network.

In an example use of the system 200, when the WCD 202 sends a request to the first PDSN 207 for a connection to the Internet 210, the first AAA server 208 performs an authentication process to determine the identity of the WCD 202 and determine if the user of the WCD 202 is authorized to access information and/or resources via the first PDSN 207. The first AAA server 208 may apply any authentication procedure or messaging protocol now known or developed later, including but not limited to the protocols known as RADIUS and DIAMETER. If the first AAA server 208 successfully authenticates the WCD 202, the either the PDSN 207 or the HA 209 assigns an IP address to the WCD 202, after which the WCD 202 can engage in wireless communications and/or access one or more resources in or via a wireless communication network.

Collectively, the first BTS 204, the first BSC 205, the first PCF 206, and the first PDSN 207 as shown in FIG. 2 are one example configuration of network elements that may be included in a first wireless communication network, such as the first wireless communication network 103 shown in FIG. 1. FIG. 2 also shows a second BTS 213, a second BSC 214, a second PCF 215 and a second PDSN 216, which collectively represent one example configuration of a second wireless communication network, such as the second wireless communication network 106 shown in FIG. 1.

Also shown in FIG. 2 is a second AAA server 218, which is in communication with the second PDSN 216. For simplicity, in the example system 200 shown in FIG. 2, the arrangement of, and the functions performed by, the second BTS 213, the second BSC 214, the second PCF 215, the second PDSN 216, and the second AAA server 217 are similar to the arrangement of, and the functions performed by, the first BTS 204, the first BSC 205, the first PCF 206, the first PDSN 207, and the first AAA server 208. However, it will be appreciated by those skilled in the art that many different configurations of network elements may be deployed in example wireless communication systems, and that one portion of a system may include a different configuration of network elements than another portion of the system.

As shown in FIG. 2, both the first AAA server 208 and the second AAA server 217 are in communication with a clearinghouse server 218. Any means of establishing communication between the first AAA server 208 and the clearinghouse server 218, and between the second AAA server 217 and the clearinghouse server 218 may be used, including, for example, dedicated wired connections, network connections, and wireless connections. The clearinghouse server 218 is capable of storing and processing information received from the first AAA server 208 and the second AAA server 217 and providing information to the first AAA server and the second AAA server. For simplicity, the clearinghouse server 218 is shown in FIG. 2 as a single structure, but it will be appreciated that the clearinghouse server 218 may be constructed from one or more processors, memory storage units, and other components.

In accordance with traditional protocols, the first authentication server 208 does not inform the second authentication server 218 of the authentication status of a WCD, such as WCD 202, when the first authentication server 208 authenticates the WCD. Under such traditional protocols, when WCD 202 moves outside of the geographic area served by BTS 204 and attempts to access a resource in a wireless network via an air interface 219 with BTS 213, the WCD 202 is prevented from accessing the resource until the second authentication server 217 authenticates the WCD 202. The time it takes the second AAA server 217 to authenticate WCD 202 may be perceived by the user as a delay or disruption in service, and may negatively impact the user's experience using the WCD and wireless communications. If an authentication server in one wireless communication network could more readily ascertain whether an authentication server in another wireless communication had already authenticated a particular WCD, it may be possible to reduce the user's perception of a delay or disruption in server.

II. Marking an Authentication Status of a WCD

With reference to FIG. 1, in accordance with example methods, when a WCD, such as WCD 101, first attempts to access a resource in or via a first wireless communication network, such as first network 103, a first authentication server, such as first authentication server 104, performs an authentication process, such as to verify the identity of the WCD and/or determine if the WCD is authorized to use the first wireless communication network to access the desired resource. Any of a number of authentication processes may be used depending on the design of the first authentication server and/or the design of the first wireless communication network. Some example authentication processes that may be used by the first authentication server are defined in the protocols known to those skilled in the art as RADIUS and DIAMETER.

In the example implementations, a token is generated during the authentication process. The token may be any piece of information associated with the WCD, such as an identifier of the WCD, an identification of a particular authentication event regarding the WCD, or a randomly generated set of data established and associated with WCD. Some example tokens take the form of a binary string of data. In some example methods, the token is generated by the WCD. In example methods where the token is generated by the WCD, the WCD stores a first copy of the token in memory accessible to the WCD, and transits a second copy of the token to the first authentication server via the first wireless communication network. In other example methods, the token is generated by the first authentication server, which then transmits a copy of the token to the WCD via the first wireless communication network. The token may also be generated by another entity, such as a component within the first wireless communication network, which may then transmit a first copy of the token to the WCD and a second copy of the token to the first authentication server.

Regardless of which entity generates the token, after the token has been generated, the first authentication server publishes a copy of the token and a corresponding identification of the first authentication server to a clearinghouse server, such as clearinghouse server 105. In response to receiving the copy of the token and the identification of the first authentication server, the clearinghouse server stores a correlation between the token and the identification of the first authentication server in memory accessible by the clearinghouse server. In some implementations of example methods, the clearinghouse server also stores a copy of the token and/or a copy of the identification of the first authentication server in memory accessible to the clearinghouse server.

With reference to FIG. 2, in some example methods, when the first AAA server 208 authenticates the WCD 202, the WCD 202 generates a binary string as a token during the authentication process performed by the first AAA server 208. After generating the token, the WCD 202 stores a first copy of the token in memory accessible by the WCD 202 and transmits a second copy of the token to the first AAA server 208. In example implementations performed in the system 200 shown in FIG. 2, the WCD 202 transmits the token via the air interface 203 to the first BTS 204, and the token is then passed by the first BSC 205, the first PCF 206, and the first PDSN 207 to the first AAA server 208. In response to receiving the token, the first AAA server 208 publishes the token and an identifier of the first AAA server 208 to the clearinghouse server 218. The first AAA server 208 may also store the token in memory of, or memory accessible to, the first AAA server 208.

As noted above, the clearinghouse server 218 responds to receiving the token and the identifier of the first AAA server 208 by establishing a correlation between the token and the identifier of the first AAA server 208, and storing a copy of the correlation in memory accessible by the clearinghouse server 218. In some of these example implementations, the clearinghouse server 218 also stores a copy of the token, and/or a copy of the identifier of the first AAA server 208 in memory accessible to the clearinghouse server 218.

In other example implementations of some of the claimed methods, the first AAA server 208 generates the token instead of the WCD 202 generating the token. In some example implementations where the first AAA server 208 generates the token, the first AAA server 208 transmits a copy of the token to the WCD 202 by passing a copy of the token to the first BTS 204 via the first PDSN 207, the first PCF 206, and the first BSC 205. In such example implementations, in response to receiving the token generated by the first AAA server 208, the first BTS 204 transmits the token over the air interface 203 to the WCD 202. In response to receiving the token, the WCD 202 stores the token in memory accessible to the WCD 202. In example methods where the first AAA sever 208 generates the token, the first AAA server 208 also publishes the token and the identifier of the first AAA server 208 to the clearinghouse server 218.

Figure 3:
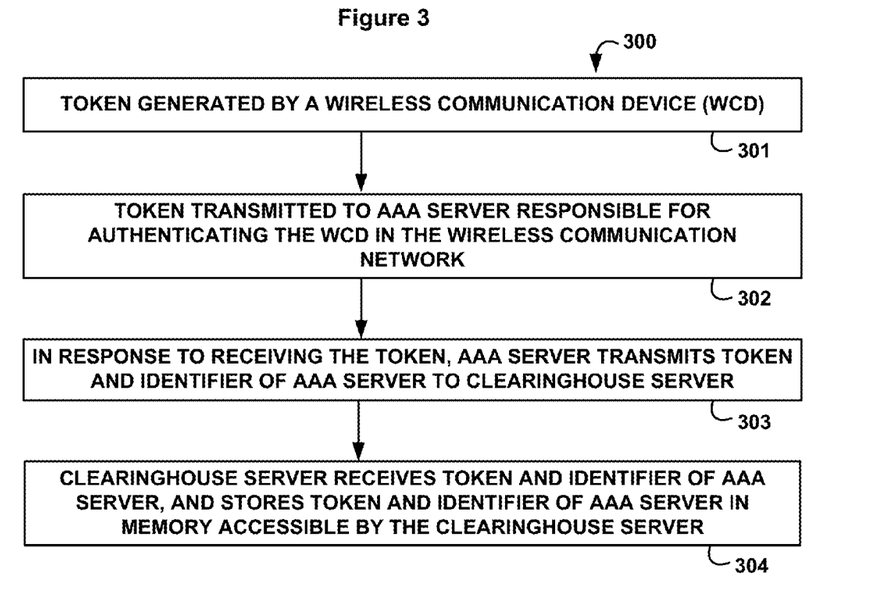
FIG. 3 is a flow chart depicting a method in accordance with a first example embodiment.

FIG. 3 is a flow chart depicting an implementation of an example method 300 wherein the token is generated by a WCD when an AAA server in a wireless communication network authenticates the WCD. As shown in element 301, the WCD generates a token and stores a copy of the token in memory accessible to the WCD. In the example implementation depicted in FIG. 3, the token is a binary string of random data generated by the WCD.

After generating the token and storing a copy of the token in memory accessible by the WCD, the WCD transmits the token to the AAA server responsible for authenticating the WCD, as shown element by 302. In the example method presented in FIG. 3, the token is transmitted by the WCD in an authentication request via an air interface between the WCD and the wireless communication network that the WCD is attempting to use to access a resource. As shown in element 303, in response to receiving the token, the AAA server transmits a copy of the token and a copy of an identifier of the AAA server to a clearinghouse server after the AAA server completes an authentication of the WCD. Any means of transmitting the copy of the token and the copy of the identifier of the AAA server to the clearinghouse server, including sending the token and identifier over a wired connection, a wireless connection, or a packet data network connection between the AAA server and the clearinghouse server.

As shown in element 304, in response to receiving a copy of the token and a copy of the identifier of the AAA server, the clearinghouse server stores a copy of the token and a copy of the identifier of the AAA server in memory accessible by the clearinghouse server. In example implementations of the method presented in FIG. 3, the clearinghouse may also establish a correlation between the token and the identifier of the AAA server, and store a copy of data representing the correlation in memory accessible to the clearinghouse server.

Figure 4:
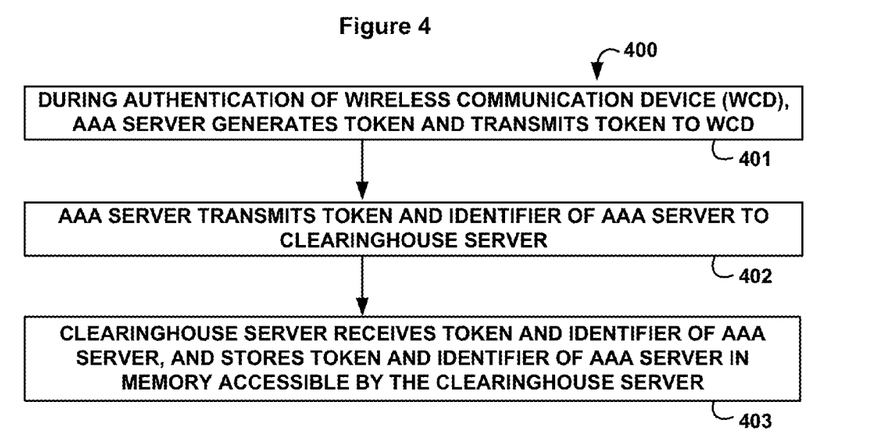
FIG. 4 is flow chart depicting a method in accordance with a second example embodiment.

FIG. 4 is a flow chart depicting an example method 400 wherein an AAA server generates a token to mark the authentication status of a WCD when the AAA server authenticates the WCD. As shown by element 401, during the authentication of a WCD, the AAA server generates a token and transmits the token to the WCD in an authentication response. In some example implementations of the method 400, the token is a binary string of information that may, for example, identify the WCD, identify a particular authentication event associated with the WCD, or represent a randomly generated set of data associated with the WCD. Depending on the configuration of the AAA server and the wireless network associated with the AAA server, a copy of the token is passed from the AAA server to any intervening network elements or entities between the AAA server and the WCD, and is sent over an air interface to the WCD. As shown by element 402, after generating and transmitting the token to the WCD, the AAA server also transmits the token and an identifier of the AAA server to the clearinghouse server. In response to receiving the token and the identifier of the AAA server from the AAA server, the clearinghouse server stores a correlation between the token and the identifier of the AAA server in memory accessible by the clearinghouse server, as shown by element 403.

As described above, after a WCD has been authenticated by an authentication server, a copy of a token is stored in memory accessible by the WCD, and a correlation between the token and the authentication server that authenticated the WCD is stored in memory accessible by a clearinghouse server. As shown in reference to in FIG. 1 and FIG. 2, multiple authentication servers may be in communication with the clearinghouse server. Thus, such configurations, the clearinghouse server is able to share information about the authentication of a WCD with multiple authentication servers.

III. Querying a Clearinghouse Server to Identify a Previous Authentication of a WCD As described above, FIG. 1 depicts two wireless communication networks. In FIG. 1, the WCD 101 is shown in communication with the first wireless communication network 103. Under traditional protocols, when the WCD 101 moves away from the first wireless communication network 103 and attempts to access a resource in or via the second wireless communication network 106, the WCD 101 must be authenticated before the WCD 101 can use the second wireless communication network 106 to access the resource. However, as described above, when a WCD is authenticated in a first wireless communication network, a first copy of a token is stored in memory accessible by the WCD, and a correlation between the token and an identification of the authentication server that authenticated the WCD is stored in memory accessible by the clearinghouse server.

When a WCD with a token stored in memory attempts to access a resource in or via a second wireless communication system, the WCD transmits a copy of the token to an authentication server in the second wireless communication network. Any of a number of methods may be used to transmit the copy of the token to the authentication server in the second wireless communication network, depending on the design of the second wireless communication network, and the particular protocols used by the second wireless network. In some example methods, the WCD transmits the copy of the token in a registration request to the second wireless communication system.

In response to receiving a copy of the token transmitted by the WCD to the authentication server in the second wireless communication network, the authentication server in the second wireless communication network responds queries a clearinghouse server. Depending on the design of the clearinghouse server and the design of the authentication server, any of a number of methods may be used to query the clearinghouse server. In example methods, the authentication server in the second wireless communication network queries the clearinghouse server by sending a copy of the token received from the WCD to the clearinghouse server and requesting the identification information for the authentication server correlated with the token.

The clearinghouse server can respond to receiving a query from the authentication server in the second wireless communication network by transmitting back to the authentication server in the second wireless communication network an identification of an authentication server that previously authenticated the WCD in another wireless network. As described above, a correlation between a token and the identification information for an authentication server is stored in memory accessible by a clearinghouse server. Upon receiving a copy of the token from the authentication server in the second wireless communication network, the clearinghouse server may retrieve from the memory the identification information for the authentication server correlated with the token, and transmit the identification information back to the authentication server in the second wireless communication network.

In some example implementations, the authentication server in the second wireless communication network responds to receiving the identification information for the authentication server correlated with the token by querying the authentication server correlated with the token. The authentication server in the second wireless communication system may query the authentication server correlated with the token to confirm the authentication status of the WCD. The authentication server in the second wireless communication system can also query the authentication server correlated with the token to request copies of data associated with the WCD that may be may stored in memory accessible by the authentication server correlated with the token, such as digital keys, passwords, or other data, depending on the design of the particular authentication server, wireless communication network, and/or other security protocols that may be in effect.

In response to receiving a query from the authentication server in the second wireless communication network, the authentication server correlated with the token may transmit information back to the authentication server in the second wireless communication network. Depending on the query received from the authentication server in the second wireless communication network, the response from the authentication server correlated with the token may include a confirmation of the authentication status of the WCD, and may include additional information associated with the WCD, such as digital keys, passwords, and/or other data. In example situations where the authentication server correlated with the token can confirm the authentication status of the WCD, the authentication server correlated with the token sends a positive response to the authentication server in the second network. In example situations where the authentication server correlated with the token cannot confirm the authentication status of the WCD, the authentication server correlated with the token sends a negative response to the authentication server in the second network.

In implementations where a positive response is sent to the authentication server in the second wireless communication network, the authentication server in the second wireless communication network responds to receiving a positive response from the authentication server correlated with the token by allowing the WCD to use the second wireless communication network to access one or more resources in or via the second wireless communication network. Depending on the design of the second wireless communication network, allowing the WCD to use the second wireless communication network to access one or more resources may include any of a number of actions, including, for example, establishing a communication link between the WCD and one or more network entities.

In accordance with some methods, the authentication server in the second wireless communication network responds to receiving a negative response from the authentication server correlated with the token by preventing the WCD from using the second wireless communication network to access a resource. In other example implementations where the authentication server in the second wireless communication network receives a negative response from the authentication server correlated with the token, the authentication server in the second wireless communication network attempts to authenticate the WCD using another authentication procedure.

In some example implementations performed in the system 100 shown in FIG. 1, when the WCD 101 attempts to access one or more resources in or via the second wireless communication network 106, the WCD 101 transmits to the second authentication server 107 a copy of a token that was generated when the WCD 101 was authenticated by the first authentication server 104. In such example implementations, the WCD 101 transmits a copy of the token over an air interface between the WCD 101 and the second wireless communication network 106. In response to receiving a copy of the token sent from WCD 101, the second authentication server 107 queries the clearinghouse server 105. In some example implementations of methods performed in system 100, the query from the second authentication server 107 to the clearinghouse server 105 includes a copy of the token received from the WCD 101 and a request for the identification information of an authentication server correlated with the token.

In some example implementations of methods performed in system 100, the clearinghouse server 105 responds to the query from the second authentication server 107 by searching memory accessible by the clearinghouse server 105 to locate the identification information for the authentication server correlated with the token and transmitting a copy of the identification information to the second authentication server 107. In system 100 depicted in FIG. 1, the authentication server correlated with the token is the first authentication server 104. In response to receiving the identification information for the first authentication server 104 from the clearinghouse server 105, the second authentication server 107 sends a query to the first authentication server 104. In some example implementations performed in system 100, the query from the second authentication server 107 to the first authentication server 104 includes a request for a confirmation of the authentication status of the WCD 101 and a copy of a data stored in memory accessible by the first authentication server 104 that relates to the WCD 101. Examples of information stored in memory accessible by the first authentication server 104 that relates to the WCD 101 include digital keys, passwords, and/or other information needed in order for the WCD to obtain information from particular information sources, such as private networks.

In one example implementation in system 100, the first authentication server 104 responds to the query from the second authentication server 107 by sending a positive response confirming that the first authentication server 104 previously authenticated the WCD 101. In response to receiving the positive response from the first authentication server 104, the second authentication server 107 allows the WCD 101 to use the second wireless communication system 106 to access a resource. Upon receiving a positive response from the first authentication server 104, the second authentication server 107 allows the WCD 101 to use the second wireless communication network 106 to access a resource.

In another example implementation performed in system 100, the first authentication server 104 responds to the query from the second authentication server 107 by sending a negative response. Depending on the design of the first authentication server 104 and/or the protocols used within the system 100, any of a number situations may cause the first authentication server 104 to send a negative response. In one example situation, the first authentication server 104 may be designed such that authentications of WCDs, such as WCD 101, expire after a predetermined period of time. In an example of such a situation, if the predetermined period of time expired before the second authentication server 107 attempted to query the first authentication server 104, the first authentication server 104 would send a negative response to the second authentication server 107. Upon receiving a negative response from the first authentication server 104, the second authentication server 107 does not permit the WCD 101 to use the second wireless communication network 106 to access a resource.

Figure 5:
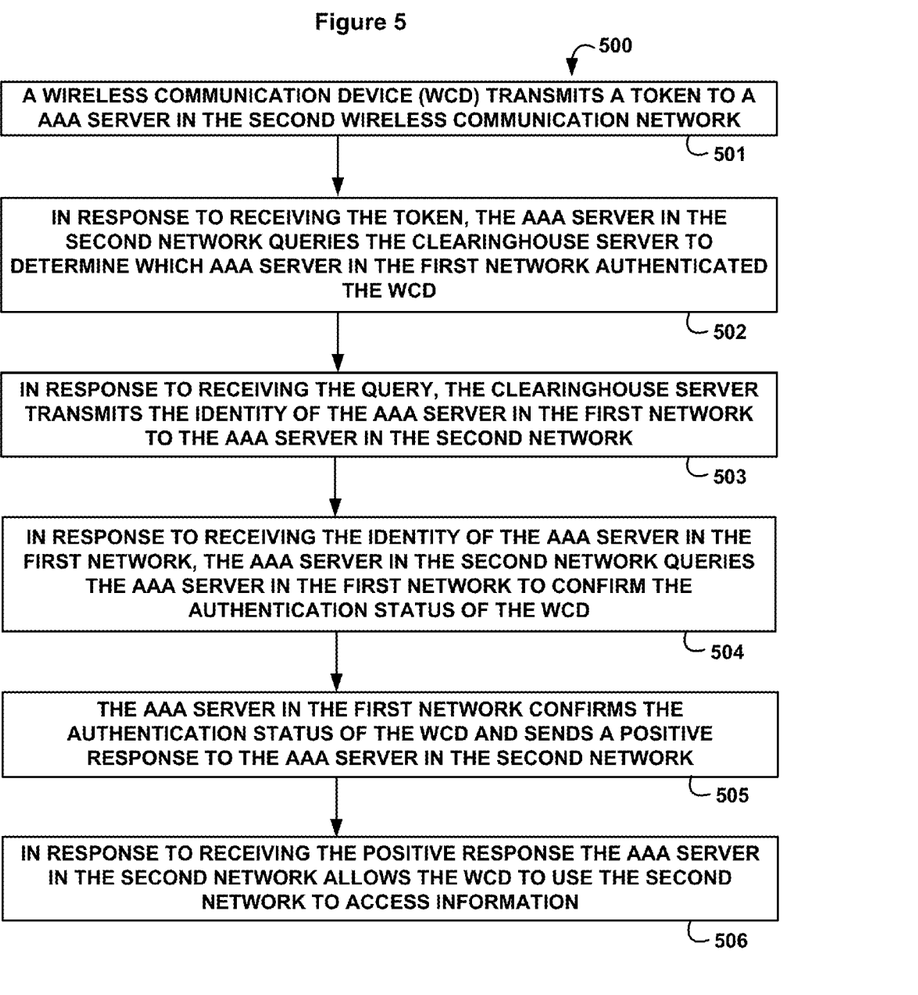
FIG. 5 is a flow chart depicting a method in accordance with a third example embodiment.

FIG. 5 is a flow chart depicting an implementation of an example method 500 wherein a WCD that possesses a token moves from a first wireless communication network to a second network and attempts to access one or more resources in or via the second wireless communication network. As shown in element 501, the WCD transmits a token to a server in the second network, namely, an AAA server in the second network. If the second network is arranged similarly to the second network 106 in shown in FIG. 1, the WCD transmits the token via the reverse link of an air interface between the WCD and the second network, which in turn passes the token to the server in the second network via any intervening network elements or entities within the second network.

As shown by element 502, the AAA server in the second network responds to receiving the token by querying the clearinghouse server to determine which AAA server in the first network authenticated the WCD. In element 502, the token is included in the query to the clearinghouse server. As described above, when a WCD is authenticated in a first network, the clearinghouse server stores in memory accessible by the clearinghouse server a copy of the token, an identification of the AAA server that authenticated the WCD, and correlation between the token and the authenticating AAA server. In element 502, the clearinghouse server is capable of identifying which AAA server authenticated a WCD associated with a particular token.

As shown in element 503, in response to receiving the query from the AAA server in the second network, the clearinghouse server identifies the AAA server that authenticated the WCD in the first network and transmits the identity of that AAA server to the AAA server in the second network. Since the query from the AAA server in the second network to the clearinghouse server included the token, and the clearinghouse server is capable of accessing memory that stores the identity of the AAA server that authenticated the WCD and a correlation between that AAA server and the token, the clearinghouse server is able to determine the identity of the AAA server that authenticated the WCD in the first network and send information identifying that AAA server to the AAA server in the second network.

In element 504, the AAA server in the second network responds to receiving the identity of the AAA server in the first network, by querying the AAA server in the first network to request confirmation of the authentication status of the WCD. As shown in element 505, if the AAA server in the first network can confirm the authentication status of the WCD, the AAA server in the first network responds to the AAA server in the second network by sending a positive response. In some example implementations of element 505, the AAA server in the first network also sends to the AAA server in the second network a copy of other information associated with the WCD that the AAA server in the first network stored in memory accessible by the AAA server in the first network, such as a digital key that the WCD may need in order to access a private network that is accessible via both the first network and the second network.

In response to receiving the positive response from the AAA server in the first network, the AAA server in the second network allows the WCD to use the second network to access a resource via the second network, as shown in element 506.

While many of the examples described above have relate to authentication procedures involving a WCD and a network entity, those skilled in the art will appreciate that the methods described herein can be implemented between one or more network entities. For example, the methods described herein may be utilized in network architectures and implementations of protocols where an authentication procedure is used between a home agent and an authentication server, or another network entity.

Example embodiments of the present invention have been described above. However, those skilled in the art will understand that changes and modifications may be made to these embodiments without departing from the true scope and spirit of the invention, which is defined by the claims.

What is claimed is:

1. A method for verifying an authentication status of a wireless communication device having previously been authenticated by a first authentication server associated with a first wireless communication network, the method comprising:

receiving, at a second authentication server associated with a second wireless communication network, a copy of a token associated with the wireless communication device;

in response to receiving the copy of the token associated with the wireless communication device, transmitting, from the second authentication server to an intermediate server that is configured to communicate with the first authentication server and the second authentication server, a request for an identification of the first authentication server based on the received copy of the token, the first authentication server having previously provided the intermediate server with a correlation between the token and the identification of the first authentication server;

receiving at the second authentication server, in response to the request, the identification of the first authentication server based on the correlation that the first authentication server had provided to the intermediate server; and     responsive to receiving at the second authentication server the identification of the first authentication server, transmitting from the second authentication server to the first authentication server a request for a confirmation of an authentication status of the wireless communication device.

2. The method of claim 1 wherein transmitting from the second authentication server to the intermediate server the request for the identification of the first authentication server comprises transmitting from the second authentication server to the intermediate server a copy of the token associated with the wireless communication device.

3. The method of claim 2 wherein the intermediate server is a clearinghouse server configured to access memory containing a correlation between the token and the identification of the first authentication server.

4. The method of claim 1 further comprising:
   receiving at the second authentication server the confirmation of the authentication status of the wireless communication device; and
   in response to receiving the confirmation of the authentication status of the wireless communication device, allowing the wireless communication device to access a resource via the second wireless communication network.

5. The method of claim 1 wherein the first authentication server is a first authentication, authorization, and accounting server and the second authentication server is a second authentication, authorization, and accounting server.

6. The method of claim 1 wherein the token associated with the wireless communication device is a binary string of data that identifies the wireless communication device.

7. A method for verifying an authentication status of a wireless communication device having previously been authenticated by a first authentication server associated with a first wireless communication network, the method comprising:
   at an intermediate server configured to communicate with the first authentication server associated and a second authentication server associated with a second wireless communication network, receiving from the first authentication server a token associated with the wireless communication device and an identification of the first authentication server;
   in response to receiving the token associated with the wireless communication device and the identification of the first authentication server, the intermediate server storing in memory a correlation between the token and the identification of the first authentication server;
   at the intermediate server, after storing the correlation, receiving from the second authentication server a request comprising a copy of the token; and
   in response to receiving from the second authentication server the request comprising the copy of the token, (i) the intermediate server using the stored correlation to determine, based on the received copy of the token, the identification of the first authentication server, and (ii) transmitting from the intermediate server to the second authentication server the determined identification of the first authentication server, to enable the second authentication server to query the identified first server to determine an authentication status of the wireless communication device.

8. The method of claim 7, wherein the intermediate server is a clearinghouse server.

9. The method of claim 8, wherein the first authentication server is a first authentication, authorization, and accounting server and the second authentication server is a second authentication, authorization, and accounting server.

10. The method of claim 7 wherein the token is a binary string of data that identifies the wireless communication device.

11. The method of claim 7, wherein receiving the token associated with the wireless communication device comprises receiving a copy of the token generated by the wireless communication device.

* * * * *